Feb. 12, 1952 — A. RAPPL — 2,585,587
CONTROL SYSTEM FOR MOTOR VEHICLE WINDOW OPERATORS
Filed Nov. 2, 1946
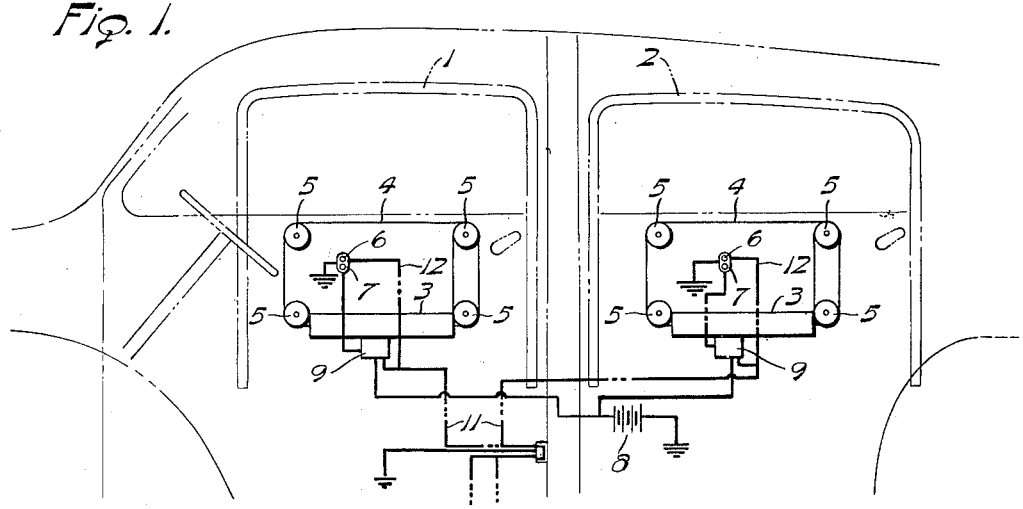
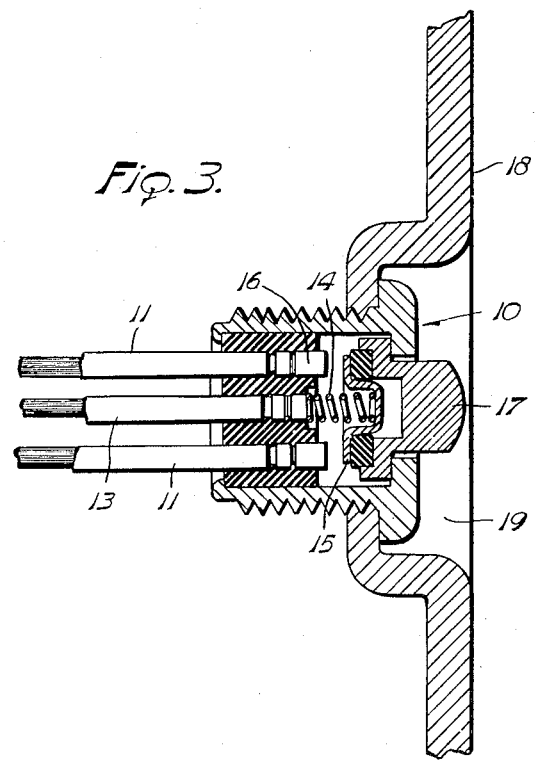
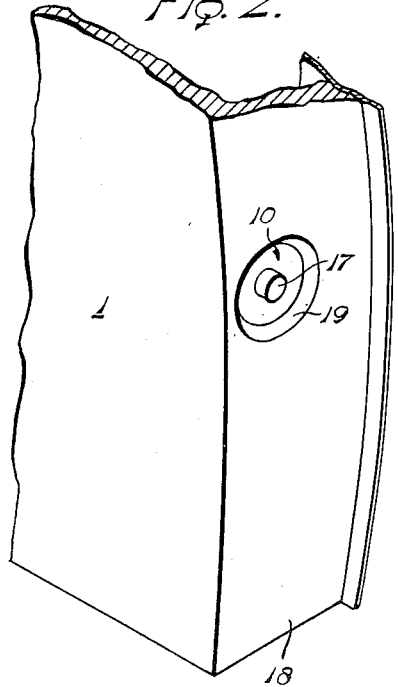
INVENTOR
Anton Rappl
BY
Beay, Brooks, Buckley + Beau.
ATTORNEYS Patented Feb. 12, 1952

2,585,587

UNITED STATES PATENT OFFICE 2,585,587

CONTROL SYSTEM FOR MOTOR VEHICLE WINDOW OPERATORS

Anton Rappl, Eggertsville, N. Y., assignor to Trico Products Corporation, Buffalo, N. Y.

Application November 2, 1946, Serial No. 707,506

2 Claims. (Cl. 296—44)

This invention relates to motor vehicles and more particularly to a powered window system. It has heretofore been proposed to have individual window operators powered by fluid pressure or electrical motors, with individual controls whereby the several passengers may regulate their windows according to their desires. When parking the vehicle the motorist has previously been required to reach for and manipulate the controls of all windows left open by the departing passenger.

The primary object of the present invention is to provide a window system by which the closing of all open windows may be facilitated and expedited for parking the vehicle.

Further, the invention resides in a window system by which opened windows may be readily closed by the motorist after he has alighted from the parked vehicle and without the necessity of re-entering the same and climbing over to the more remote individual controls.

More particularly the invention is found to reside in a window system wherein a master control is disposed in a normally concealed or protected place against being idly tampered with, while at the same time the arrangement is such that the master control will be readily accessible to the motorist as he is about to leave his parked car.

The foregoing and other objects will manifest themselves as the following description progresses, in which reference is made to the accompanying drawing, wherein:

Fig. 1 is a diagrammatic illustration of a powered window system embodying the present invention;

Fig. 2 is a fragmentary perspective showing the master control inset into the free edge of the door; and Fig. 3 is a sectional view through the door showing the inset control.

Referring in greater detail to the accompanying drawing, the numeral 1 designates the right front door at the passenger or curb side of the vehicle and 2 the right rear door, each having a window adapted to be raised and lowered by a fluid pressure motor 3 and an interposed flexible transmission 4 taking about pulleys 5. An "up" or window closing button switch 6 and a "down" or window opening button switch 7 are connected in circuit with a source of electrical energy 8 and a regulating valve 9 by which the motorist may selectively adjust his window for greater comfort. This window system is described with greater particularity in copending application Serial No. 583,147 filed March 16, 1945, now Patent 2,528,145 granted October 31, 1950.

In accordance with the present invention a master control switch generally indicated at 10 is connected by circuit wires 11 to the window closing circuits 12 of the several window operators. By this arrangement the master switch shunts the several window closing switches 6 so as to effect the simultaneous closing of any and all windows which may have been left open by the passengers. The master switch has a ground connection 13 electrically connected by a coil spring 14 to a depressible contact plate 15. By depressing the switch button 17 the plate 15 will be brought down upon the contact points 16 for closing the several circuits of the regulating valves 9 and thereby effect actuation of the individual window operators.

The master switch is protected against accidental operation while the vehicle is in motion. To this end a master switch is mounted on the door or door frame, preferably in the free edge 18 of the former so as to be more accessible by reason of the fact that it will be swung outwardly away from the vehicle when the door is open. Therefore, the motorist may stand alongside of his vehicle and have the master switch disposed before him on the free edge of the open door. By being carried on the free edge of the door the master control will be protected and concealed at all times when the door is not open. It will, therefore, be impossible for anyone to tamper with the master control while the vehicle is in motion.

A further feature of the invention resides in having the master control inset in the free edge, as by providing a depression or recess 19 of sufficient depth to preclude the switch button 17 projecting above the rim of the depression. This is clearly shown in Fig. 3 wherein it will be apparent that the button will be disposed inwardly to avoid passengers accidentally wiping thereover and thereby closing the switch in an unauthorized manner. By placing the master switch on the free edge of the right door the motorist will be in a safe position for manipulating the switch. Obviously, it could be placed on the door at the driver's side of the vehicle, but this is undesired because of the hazard of the traffic stream on that side of the vehicle.

The arrangement facilitates the parking of the vehicle since the motorist may simply depress the button in the free edge of the door as he is about to close the same for the final parking maneuver. It is unnecessary for him to re-enter the vehicle and reach over the back of the front seat to the individual controls, but he can readily close the windows from his standing position on the sidewalk over which the free edge of the door hangs in its open position.

While the foregoing description has been given in detail, it is not by way of limitation since the inventive concept is capable of assuming other physical embodiments without departing from the spirit of the invention and the scope of the appended claims.

What is claimed is:

1. A motor vehicle having a window, an operator therefor including a motor connected to the window for opening and closing the same and a control for operating the motor to so open and close such window, said control being in the form of a switch accessible from within the vehicle, a door giving access to the interior of the vehicle and closable against a supporting frame, the frame and door having parts opposing each other when the door is in a closed position, and a window closing control arranged on one of the closed parts for being protected and concealed when the door is in its closed position and being accessible when the door is in an open position, said second control being operatively connected to said window motor and operable to close the window.

2. A motor vehicle having a window, an operator therefor including a motor connected to the window for opening and closing the same and a control for operating the motor to so open and close such window, said control being in the form of a switch having a window opening circuit and a window closing circuit, a door giving access to the interior of the vehicle and closable against a supporting frame, the frame and door having parts opposing each other when the door is in a closed position, the opposing part on the door being provided with a recess, and a window closing switch inset within the recess to be located within the body lines of the door for avoiding actuation when the door is being closed, said second switch being connected for energizing the motor of the operator to close the window when the door is in an open position.

ANTON RAPPL.

REFERENCES CITED

The following references are of record in the file of this patent:

UNITED STATES PATENTS

| Number | Name | Date |
| --- | --- | --- |
| 1,963,227 | Crawford et al. | June 19, 1934 |
| 2,418,031 | Horton | Mar. 25, 1947 |
| 2,425,391 | Parsons | Aug. 12, 1947 |